United States Patent [19]

Kamio

[11] Patent Number: 4,848,527
[45] Date of Patent: Jul. 18, 1989

[54] INERTIAL BRAKE UNIT FOR AIR CLUTCH

[75] Inventor: Takenori Kamio, Neyagawa, Japan

[73] Assignee: Kabushiki Kaisha Daikin Seisakusho, Osaka, Japan

[21] Appl. No.: 144,739

[22] Filed: Jan. 19, 1988

Related U.S. Application Data

[63] Continuation of Ser. No. 849,303, Apr. 8, 1986, abandoned.

[30] Foreign Application Priority Data

Apr. 24, 1985 [JP] Japan .................................. 60-87781

[51] Int. Cl.4 ............................................ F16D 67/04
[52] U.S. Cl. ................................. 192/13 R; 192/12 C; 192/18 A
[58] Field of Search ................. 192/12 C, 13 R, 13 A, 192/15, 18 A, 85 A, 85 AA, 87.18

[56] References Cited

U.S. PATENT DOCUMENTS

| | | | |
|---|---|---|---|
| 3,213,989 | 10/1965 | Harting | 192/18 A X |
| 3,507,372 | 4/1970 | Gilbertson et al. | 192/15 X |
| 3,743,070 | 7/1973 | Howard et al. | 192/18 A X |
| 3,912,058 | 10/1975 | Parkins | 192/18 A |
| 3,942,617 | 3/1976 | Poon | 192/13 R X |
| 4,299,314 | 11/1981 | Parsons et al. | 192/12 C |
| 4,574,926 | 3/1986 | Bubak | 192/18 A |
| 4,613,024 | 9/1986 | Irikura et al. | 192/18 A |
| 4,646,894 | 3/1987 | Kamio | 192/85 AA |

FOREIGN PATENT DOCUMENTS

| | | | |
|---|---|---|---|
| 57-86643 | 5/1982 | Japan | 192/12 C |
| 57-204326 | 12/1982 | Japan | 192/85 AA |
| 60-104465 | 6/1985 | Japan | 192/13 R |

Primary Examiner—Rodney H. Bonck
Assistant Examiner—Richard M. Lorence
Attorney, Agent, or Firm—Bradford E. Kile

[57] ABSTRACT

An inertial brake unit for an air clutch includes a concentric inertial brake chamber in a rotary joint for the air clutch, a disc brake, a piston and a pressure chamber. The brake unit also includes a pneumatic pressure control mechanism so that the piston can brake the disc when pressurized air is supplied to said pressure chamber at the time of disengaging the clutch.

6 Claims, 2 Drawing Sheets

1

INERTIAL BRAKE UNIT FOR AIR CLUTCH

This application is a continuation of application Ser. No. 849,303, filed Apr. 8, 1986, now abandoned.

FIELD OF THE INVENTION

This invention relates to an inertial brake unit for an air clutch suitable mainly for a vehicle.

DESCRIPTION OF THE PRIOR ART

In a conventional inertial brake unit in which a clutch pedal is connected through a rod to a clutch releasing part for mechanically engaging and disengaging a clutch, a mechanism is employed wherein an inertial brake for controlling the inertia of a clutch output shaft is mechanically connected to the clutch releasing part when disengaging the clutch, and the inertial brake is thus actuated in association with the disengaging operation of the clutch. In an air clutch, however, a mechanism which associates an operation of the inertial brake with that of the clutch, has not been employed.

Therefore, it would be desirable to associate an inertial brake with an air clutch. However, differing from tbe mechanical type, ordinary air clutch is so constructed that the air clutch is engaged and disengaged by changing an air pressure through means of a control valve interlocked with the clutch pedal. Namely, said rod is not provided therein, and it is difficult to employ a mechanism wherein a mechanical inertial brake is interlocked with the air cluch in engaging and disengaging operations of clutch. Especially, when an inertial brake unit is equipped to a vehicle having no synchro device, it is necessary to change the design of the inertial brake so that a conventional mechanism can not be employed as it is.

SUMMARY OF THE INVENTION (Problem to be solved by the invention)

In mechanical inertial brakes employed conventionally for mechanical clutches, it is difficult to interlock the inertial brake with the air clutch.

This invention is intended to solve the above-mentioned problem by providing a pneumatic intertial brake unit suitable for the air clutch.

(Measure to solve the problem)

This invention relates to an inertial brake unit for an air clutch, in which a cylindrical passage communicating with a pneumatic actuator actuating an air clutch is provided concentrically around an outer peripheral side of a clutch output shaft; an interconnecting passage communicating with said cylindrical passage is provided in a rotary joint which is disposed at an outer peripheral side of and concentrically with the clutch output shaft, said interconnecting passage being in communication with an external air pressure control mechanism; an inertial brake chamber is formed concentrically in said rotary joint; a brake disc which is connected at its inner peripheral end with the clutch output shaft rotatably integrally, and a piston which is connected to the rotary joint slidingly only in its axial direction and is able to press on the disc brake, being disposed in the inertial brake chamber; a pressure chamber formed behind the piston in communication with said air pressure control mechanism so that the piston can brake the brake disc when pressurized air is supplied to said pressure chamber at the time of disengaging the clutch.

DETAILED DESCRIPTION OF THE INVENTION

Figure 1:
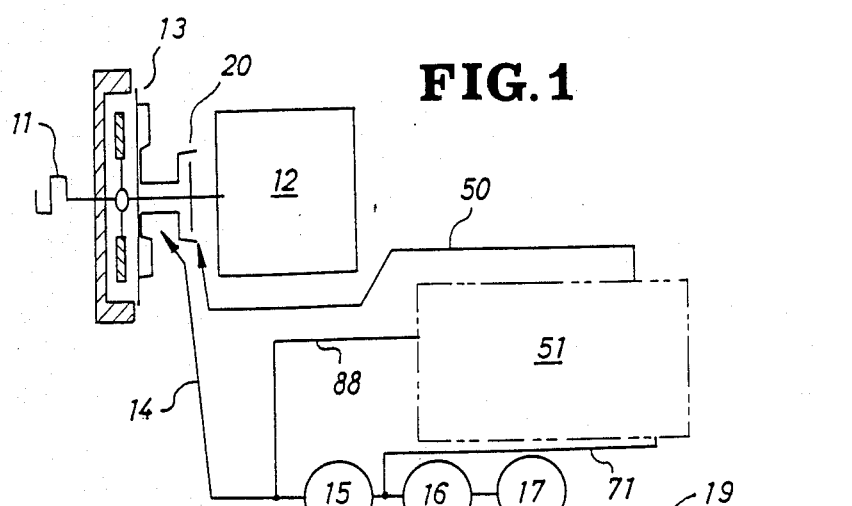
FIG. 1 is a partial schematic diagram of a vehicle employing an inertial brake unit according to the present invention.

In FIG. 1, an air clutch 13 and a rotary joint 20 with an inertial brake described herein is disposed between a crank shaft 11 and a transmission 12 of an engine. The air clutch 13 communicates through piping 14 with an air clutch control valve 15, and the air clutch control valve 15 is in turn connected through a regulator valve 16 to a compressor 17. Although a detailed construction of the air clutch control valve 15 is omitted here, the air clutch control valve 15 is so designed that it receives pressurized air from the compressor 17 and supplies a pressure through the piping 14 to the air clutch 13 which corresponds to the extent of depression of a clutch pedal. Namely, the extent of depression of the clutch pedal 18 by an operator is transmitted through the air clutch control valve 15 to the air clutch 13, thus effecting the engaging/disengaging operation of the air clutch 13.

Figure 2:
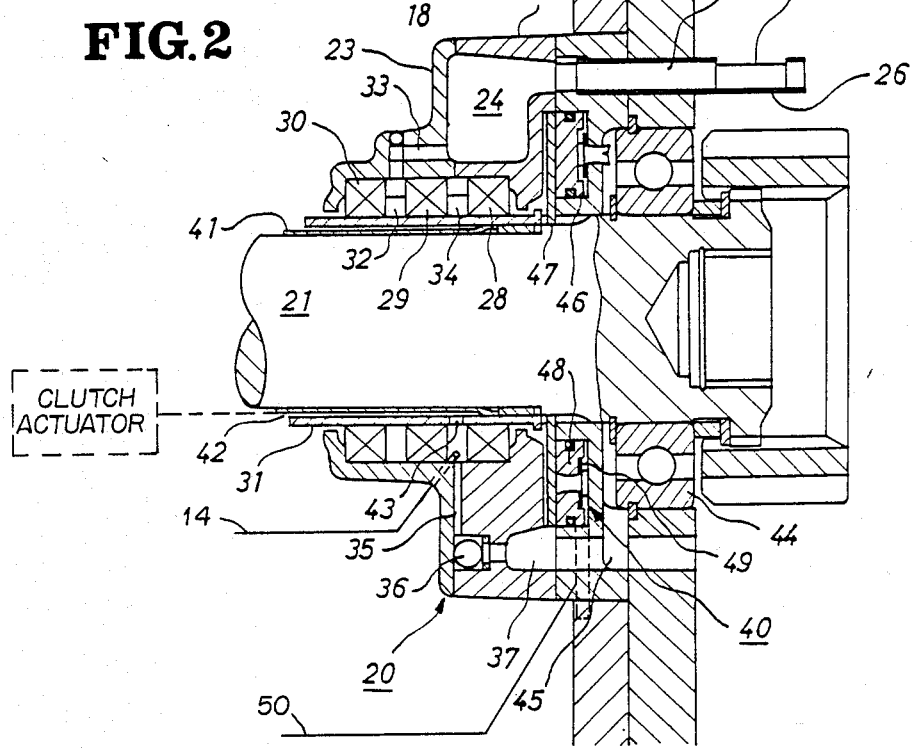
FIG. 2 is a veritcal sectional view of the inertial brake unit according to the present invention.

A detailed construction of the rotary joint is shown in FIG. 2. The rotary joint 20 includes an annular body 22 and a cover 23 which are provided around a clutch output shaft 21. The body 22 is fastened to a transmission housing 19 by bolts not-shown. The cover 23 is fastened to the body 22 on its end face opposite to the transmission housing 19 by bolts not-shown. An oil reservoir 24 is provided inside the body 22 and the cover 23. The oil reservoir 24 is provided at upper portions of the body 22 and the cover 23, and an oil passage 25 communicates with the upper portion of the oil reservoir 24. The oil passage 25 is formed of a pipe 26 fitting in holes of the body 22 and the transmission housing 19. An inlet side portion of the pipe 26 projects into the transmission housing 19, and an upper part of this projecting portion is notched to form an oil receiving hole 27.

The body 22 and the cover 23 fit onto an outer periphery of a cylindrical shaft 31 through three oil seals 28, 29 and 30. The oil seals 29 and 30 are provided inside the cover 23, and an annular oil passage 32 is formed between both the oil seals 29 and 30. The oil passage 32 communicates with a lower part of the oil reservoir 24 through an oil passage 33 in the cover 23. The oil seal 28 is provided inside the body 22, and an annular air passage 34 is formed between the oil seals 28 and 29. An outer peripheral portion of the air passage 34 communicates at its one end with the piping 14 shown in FIG. 1 which is fixed to the rotary joint 20 through a passage in the rotary joint 20.

An upper end of a leaked oil discharging passage 35 is connected to a lower portion of the air passage 34 of FIG. 2. The leaked oil discharging passage 35 is provided between the body 22 and the cover 23, and its lower end is connected to an oil discharging passage 37 through a ball valve mechanism 36. The oil discharging passage 37 extends approximately horizontally in the body 22 and communicates with an installation space 45 of a bearing 44.

On the other hand, the cylindrical shaft 31 extends from the rotary joint 20 to the air clutch 13 (FIG. 1). A cylindrical shaft 41 of small diameter is provided inside the cylindrical shaft 31, and an air passage 42 is formed between the both cylindrical shafts 31 & 41. The cylindrical shaft 31 has a hole 43 between one end of the air passage 42 and said air passage 34 so that said air passage 34 communicates with air passage 42 through a hole 43. The air passage 42 is further connected to a pneumatic actuator (not shown) provided on the air clutch 13 (FIG. 1).

On an inner peripheral part of the body 22, an annular brake cylinder 46 is housed in an inertial brake chamber 40 which is formed between the oil reservoir 24 and the bearing 44, and at the same time an annular brake disc chamber is formed in succession to the cylinder 46, thus the inertial brake chamber being composed of the cylinder 46 and the brake disc chamber. The cylinder 46 and the brake disc chamber are positioned concentrically with the rotary joint 20, and the brake disc chamber opens to an inner peripheral end of the body 22. A flat-plate-shape brake disc 47 extending in radial direction fits axially slidingly in the brake disc chamber. An inner peripheral part of the disc brake 47 spline fits onto a spline formed on an outer peripheral surface of the clutch output shaft 21 to be connected thereto freely slidingly in the axial direction only. An annular piston 48 concentric with the clutch output shaft 21 fits axially slidingly in the cylinder 46 and between the bearing 44 and brake disc 47, in such a manner that airtightness is kept by seal rings provided on its inner and outer peripheral end faces respectively. A leaf spring strap plate 49, which consists of a spring member fixed at one end to the body 22 and fixed at its other end to the piston 48, is provided between a bearing 44 side end face of the cylinder 46 and the piston 48. The leaf spring 49 extends approximately in a circumferential direction of the cylinder 46, and at the same time urges the piston against cylinder 46 when the clutch is engaged. A pressure chamber formed by the cylinder 46 and the piston 48 is connected through a not-shown passage formed in the body 22 to a piping 50 communicating with an inertial brake control valve 51 of FIG. 1.

Figure 3:
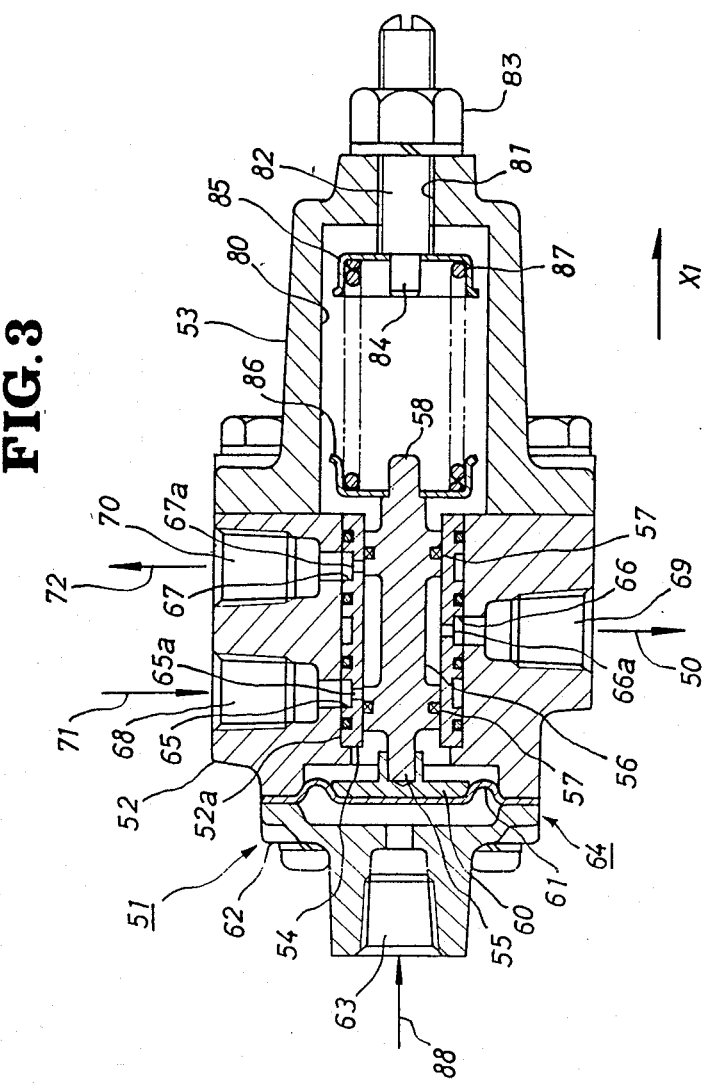
FIG. 3 is a vertical sectional view of an inertial brake control valve.

Details of the inertial brake control valve 51 are shown in FIG. 3. The inertial brake control valve 51 is an approximately cylindrical member formed by connecting a valve body 52 to a spring body 53. The valve body 52 has at its central part a hole 52a and a cylindrical spool sleeve 54 fits in the hole 52a through an O-ring. A spool fits freely slidingly in the spool sleeve 54. The spool 55 has a groove 56 at its central outer periphery, and has ring-shape seals 57 at outer peripheries of lands on both sides of the groove 56. A projection 58 projecting to and concentric with the spring body 53 is formed in the spool 55. A disc-shape diaphragm washer 60 is fixed through a central projection to the opposite side of the spool 55 (left side of FIG. 3). The diaphragm washer 60 is covered by a diaphragm 61. An outer peripheral part of a diaphragm cover 62 covering the diaphragm 61 is secured to the valve body 52 airtightly, and at the same time holds an outer peripheral part of the diaphragm 61. A passage 63 is provided at a central part of the diaphragm cover 62, and a pneumatic feedback mechanism 64 is formed of the diaphragm 61 and the diaphragm cover 62 etc.

On the other hand, three annular grooves 65, 66 and 67 are formed on an outer peripheral part of the spool sleeve 54 with axial distances left therebetween, and further air-vent holes 65a, 66a and 67a connecting the annular grooves 65, 66 and 67 with an inner peripheral side of the spool sleeve 54 are formed. Morever, passages 68, 69 and 70 opening from the annular grooves 65, 67 and 67 to a radial outside are formed in the valve body. The passage 68 is connected to a piping 71 communicating through the pressure regulator valve 16 with the compressor 17, and the passage 70 is connected to an exhaust pipe 72. The passage 69 disposed midway between the passage 68 and the passage 70 communicates with the above-mentioned piping 50.

A control spring chamber 80 opening to and concentric with the spool 35 is formed in the spring body 53, and an axial female thread hole 81 is formed at a bottom center of the control spring chamber 80. An adjust bolt 82 is screwed in the female thread hole 81, and the adjust bolt 82 is locked by a lock nut 83 screwed onto the adjust bolt 82. Holes formed at centers of spring guides 85 and 86 fit onto said projection 58 and a projection 84 provided at an end portion of the adjust bolt 82 projecting into the control spring chamber 80. The spring guides 85 and 86 are memebers disposed so as to face each other, and an adjust spring 87 is compressively installed between the both spring guides 85 and 86. Incidentally, one end of a piping 88 is connected to the passage 63, and the other end of the piping 88 is connected to the piping 14 as illustrated in FIG. 1.

Function will be described hereunder. Now, for example, a state wherein the clutch pedal 18 of FIG. 1 is not stepped on by the operator will be considered. In this case, the high-pressure air is supplied from the air clutch control valve 15 through the piping 14 to the air clutch 13, and the air clutch 13 is brought into the engaging state. Further, the high-pressure air is also supplied through the piping 88 to the diaphragm 61 of FIG. 3, and the spool 55 slides in the direction of arrow X1 against the adjust spring 87 so that the groove 56 becomes open to the exhaust pipe 72 side through the air-vent hole 67a.

At the same time, the pressurized air from the air clutch control valve 15 (FIG. 1) is supplied through the air passages 34 and 42 of FIG. 2 to a not-shown pneumatic actuator of the air clutch 13 (FIG. 1). On the other hand, the pressurized air is not supplied to the pressure chamber of the piston 48 communicating with the piping 50 (FIG. 1) so that the piston 48 is isolated from the disc brake 47 by the strap plate 49. Namely, the air inertial brake 40 does not brake the clutch output shaft 21.

Then, when the clutch pedal 18 of FIG. 1 is stepped on, the pressure of air to the piping 14 side drops due to the air clutch control valve 15. Therefore, the air clutch 13 is brought into the disengaging state, and at the same time the pressure through the piping 88 to the diaphragm 61 of FIG. 3 will also drop. When a load on the spool 55 caused by the diaphragm 61 in the direciton of arrow X1 is decreased, the spool 55 is shifted by the adjust spring 87 in the direction opposite to X1, thereby the air-vent hole 67a is closed and at the same time the air-vent hole 65a is opened. When the air-vent hole 65a is opened, the pressurized air is supplied from the piping 71 through the annular groove 65, the groove 56, the annular groove 66 and the piping 50 to the pressure chamber of the piston 48 of FIG. 2. Therefore, the piston 48 slides to the brake disc 47 side against the strap plate 49. When the brake disc 47 is sandwiched between the body 22 and the piston 48, a produced friction brakes the clutch output shaft 21.

When releasing the step-on force gradually from the state where the clutch pedal 18 is fully stepped on, the supply pressure to the piping 14 produced by the air clutch control valve 15 increases gradually corresponding to the above operation, the air clutch 13 gets through the clutch-half-engaging state to the clutch engaging state. The change in air pressure to the piping 14 is also transmitted through the piping 88 to the diaphragm 61 of FIG. 3. When the pressure to the diaphragm 61 increases, the spool 55 moves gradually toward the direction of X1 against the adjust spring 87 and closes the air-vent hole 65a, then opens the air-vent hole 67a. The air pressure at the piping 50 side is thereby released outside through the air-vent hole 67a, the annular groove 67 and the discharge pipe 72; the pressure in the pressure chamber of the piston 48 of FIG. 2 drops to isolate the piston from the brake disc 47 by means of the strap plate 49; thus the air inertial brake 40 releases the braking function on the clutch output shaft 21.

Incidentally, in the rotary joint of FIG. 2, a part of splash oil inside the transmission housing 19 falls in the oil receiving hole 27 and flows through the oil passage 25 to the oil reservoir 24. Oil in the oil reservoir 24 flows through the oil passage 33 in the oil passage 32 to be fed to sliding surfaces of the oil seals 28, 29 and 30. A part of oil lubricating the oil seals 28, 29 and 30 leaks in the leaked oil discharging passage 35. Since the ball valve mechanism 36 opens while the air passage 34 is not subjected to the pressurized air, oil in the leaked oil discharging passage 35 flows in the discharge oil passage 37 to be returned to an inside of the transmission housing 19. When the leaked oil discharging passage 35 is subjected to the pressurized air, the ball valve mechanism 36 closes to eliminate the possibility of the air for pressurizing the actuator flowing in the discharge oil passage 37.

Further, an extent of compression of the adjust spring 87 in the inertial brake control valve 51 can be changed by changing an extent of screwing-in of the adjust bolt 82. Working characteristics of the inertial brake control valve 51 can thus be changed freely.

(Effect of the invention)

The cylindrical passage 42 communicating with the pneumatic actuator actuating the air clutch 13 is provided concentrically with and at the outer peripheral side of the clutch output shaft 21; the interconnecting passage (the air passage 34 etc.) communicating with said cylindrical passage 42 is provided in the rotary joint 20 which is disposed at the outer peripheral side of and concentrically with the clutch output shaft 21 and fixed to the housing 19 side, said interconnecting passage communicating with the external air pressure control mechanism (the air clutch control valve 15, the inertial brake control valve 51 etc.); the inertial brake chamber (the cylinder 46 etc.) is formed concentrically in said rotary joint 20; the brake disc 47 which is connected at its inner peripheral end with the clutch output shaft 21 rotatably integrally, and the piston 48 which is connected to the rotary joint 20 slidingly only in its axial direction and is able to press on the disc brake 47, are disposed in the inertial brake chamber; the pressure chamber formed behind the piston 48 is communicating with said air pressure control mechanism so that the piston 48 can brake the brake disc 47 when the pressurized air is supplied to said pressure chamber at the time of disengaging the clutch. Therefore, the following advantages become obtainable:

(a) The pneumatic inertial brake unit for the air clutch 13 is available. Accordingly, even in a vehicle employing no snychro device, the air clutch 13 with inertial brake can be used without difficulty.

(b) The entire inertial brake unit can be fabricated into a compact size because the inertial brake 40 is incorporated in the rotary joint 20 for the air clutch 13.

(c) Handling in assemby etc. becomes simple because the inertial brake 40 which is to be used as a pair together with the air clutch 13, is integral with the rotary joint for the air clutch 13.

What is claimed is:

1. An inertial brake unit for an air clutch comprising:
   (a) a clutch output shaft having an axial inner side and an axial outer side;
   (b) a pneumatic actuator;
   (c) a cylindrical passage disposed peripherally about said axial outer side of said clutch output shaft and in communication with said pneumatic actuator;
   (d) a rotary joint disposed peripherally about said clutch output shaft;
   (e) an interconnecting passage concentrically disposed at said axial outer side of said clutch shaft and is in communication with said cylindrical passage and with an external air pressure control mechanism; said external air pressure control mechanism includes an air clutch control valve and an inertial brake control valve; said inertial brake control valve including a valve body, a spring body and a pneumatic feedback mechanism;
   (f) an inertial brake chamber formed concentrically of said inner side of said clutch output shaft, said brake chamber comprising;
      (i) a brake disc having an inner peripheral end and an outer peripheral end, said inner peripheral end being connected to said axial inner side of said clutch output shaft;
      (ii) a brake cylinder;
      (iii) a piston disposed within said brake cylinder and slidingly connected thereto such that said piston is capable of movement in a direction parallel to the length of said clutch output shaft;
      (iv) a pressure chamber between said brake cylinder and said piston; and
      (v) a leaf spring having a first end and a second end, said first end being connected to said piston and said second end being connected to said brake cylinder such that said spring resiliently urges said piston in a direction away from said brake disc.

2. An inertial brake unit for an air clutch as set forth in claim 1, in which said rotary joint has an annular body and a cover provided around the clutch output shaft said body is fastened to a housing; an oil reservoir is provided at inside upper portions of the body and the cover; an oil passage communicates with an upper part of the oil reservoir, said oil passage being formed of a pipe fitting in holes of the body and the housing; an inlet side part of the pipe projects into the housing and an upper part of said inlet side part is notched to form an oil receiving hole; the body and the cover fit onto an outer periphery of a cylindrical shaft through an oil seal; a lower part of the oil reservoir communicates with an oil seal portion through an oil passage inside the cover; an upper end of a leaked oil discharging passage is disposed at a lower part of the cover; the leaked oil discharging passage is vertically provided between the body and the cover and at the same time its lower end is connected to a discharge oil passage through a ball valve mechanism; and the oil discharge passage extends approximately horizontally in the body to be connected to a housing inside.

3. An inertial brake unit for an air clutch as set forth in claim 1, in which said valve body has an axial hole at its center; and a spool fits in the hole freely slidingly.

4. An inertial brake unit for an air clutch as set forth in claim 3, in which said pneumatic feedback mechanism includes a disc-shape diaphragm washer fixed to the spool, the diaphragm washer being covered by a diaphragm; said diaphragm being covered by a diaphragm cover; an outer peripheral part of the diaphragm cover covering the diaphragm is secured to the valve body airtightly and at the same time holes an outer peripheral part of the diaphragm; and an inside space of the diaphragm cover communicates with said air clutch control valve.

5. An inertial brake unit for an air clutch as set forth in claim 4, in which said spool fits freely slidingly in said hole of the valve body through a cylindrical spool sleeve, the spool having an annular groove on its central outer periphery; three annular grooves are formed on an outer peripheral part of the spool sleeve with axial distances left therebetween; air vent holes between and extending between and connecting connect the annular grooves and an inner peripheral side of the spool sleeve; passages opening from the annular grooves to a radial outside are formed in said valve body, said passages being in communication with said pressure chamber, a compressor of the pneumatic control mechanism, and an exhaust pipe respectively.

6. An inertial brake unit for an air clutch as set forth in claim 3, in which a control spring chamber opening to and concentric with the spool is formed in said spring body; and adjust bolt is screwed in the control spring chamber at its bottom center; and an adjust spring is compressively installed between said spool and an end portion of the adjust bolt projecting into the control spring chamber.

* * * * *